(12) United States Patent
Martynov

(10) Patent No.: US 6,229,600 B1
(45) Date of Patent: *May 8, 2001

(54) SPHERICAL-ABERRATION DETECTION SYSTEM AND OPTICAL DEVICE USING THE SAME

(75) Inventor: Iouri Martynov, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,657

(22) Filed: Sep. 30, 1998

(30) Foreign Application Priority Data

Oct. 6, 1997 (EP) .................................................. 97203039

(51) Int. Cl.[7] ....................................................... G01J 1/00
(52) U.S. Cl. ............................................................. 356/123
(58) Field of Search ..................................... 356/123, 445, 356/125, 127; 369/112, 58, 44.24, 44.27, 103, 109; 359/708

(56) References Cited

U.S. PATENT DOCUMENTS 5,708,638 * 1/1998 Braat et al. ........................... 369/112

OTHER PUBLICATIONS

"High Density Optical Disk System Using a New Two–Element Lens and a Thin Substrate Disk" by F. Maeda et al, Published in the Proceedings of ISOM96 p. 342–344.

* cited by examiner

Primary Examiner—Frank G. Font
Assistant Examiner—Tu T. Nguyen
(74) Attorney, Agent, or Firm—Michael E Belk

(57) ABSTRACT

The spherical aberration of an optical beam is determined by focusing the beam, and dividing its cross-section in at least two concentric zones. The sub-beams passing through the zones are focused each on a focus-detection system. The distance between the positions of the two foci is a measure for the spherical aberration present in the beam.

14 Claims, 7 Drawing Sheets

SPHERICAL-ABERRATION DETECTION SYSTEM AND OPTICAL DEVICE USING THE SAME

FIELD OF THE INVENTION

The invention is related to the field of optical system for information storage and more specifically to detection systems for detecting the beam traveling from an optical disk.

BACKGROUND OF THE INVENTION

The invention relates to a spherical-aberration detection system for measuring spherical aberration of an optical beam, to an optical device for scanning record carriers using the detection system and to a device for measuring the thickness of a transparent layer.

The measurement of spherical aberration has recently become relevant in the field of optical recording. The information density on optical record carriers may be increased by increasing the numerical aperture (NA) of the radiation beam used for reading and writing information on the record carrier. Record carriers are often scanned through a transparent layer protecting the information layer of the record carrier. A small variation of the thickness of the transparent layer causes a substantial change in the spherical aberration incurred by a high-numerical aperture radiation beam traversing the transparent layer. This spherical aberration may be reduced by using a dual lens objective system. Such a system has a first lens and a second lens, the second lens being a plano-convex lens arranged between the first and lens and the record carrier, and a small spacing between the plano surface and the record carrier. In some applications the plano-convex lens is referred to as a solid immersion lens.

The article "High density optical disk system using a new two-element lens and a thin substrate disk" by F. Maeda et al, published in the proceedings of ISOM96 p. 342–344 discloses an optical recording system having such a dual–lens objective system. The spherical aberration due to variations in the thickness of the transparent layer are compensated by changing the axial position of the plano-convex lens of the objective system. The system determines the spherical aberration in the beam reflected from the record carrier and uses this value to position the plano-convex lens. The article proposes two methods to determine the amount of spherical aberration in the reflected beam. In the first method, the envelope magnitude of the information signal read from the record carrier is measured, which will have a maximum value when the spherical aberration is at a minimum value. In the second method the shape of the focus error signal as a function of the focus error is analyzed, and the position of the plano-convex lens is optimized to obtain the desired shape.

The above citations are hereby incorporated herein in whole by reference.

SUMMARY OF THE INVENTION

The inventor recognizes that first method of maeda has as a disadvantage that it requires the presence of an information signal, making the method unsuitable for writing on an unwritten record carrier. The second method has as a disadvantage that the shape of the focus error signal must be analyzed, which requires wobbling the objective system through the point of best focus. During wobbling the reading and writing performance of the optical disk system is reduced.

It is an object of the invention to provide a spherical-aberration detection system that does not have the above disadvantages.

The object is achieved when, in accordance with a first aspect of the invention, the spherical-aberration detection system for measuring spherical aberration of an optical beam includes a plurality of focus-detection systems, each for supplying a focus error signal pertaining to radiation from one of a plurality of concentric zones in a cross-section of the optical beam, and a signal processor for deriving a measure of the spherical aberration from the plurality of focus error signals.

The invention is based on the recognition that marginal rays and paraxial rays of a beam having spherical aberration have different focal points. The detection system according to the invention has several focus-detection systems for measuring the positions of the focal points for different parts of the beam cross-section. If the beam has no spherical aberration, the focal points of the marginal and paraxial rays will coincide, and the different focus-detection systems will measure the same position of the focal point. In the presence of spherical aberration, the positions of the focal points will be different, and the differences between the positions provides a measure for the spherical aberration in the beam.

In a simple form the spherical-aberration detection system includes only two focus-detection systems for determining the position of the focal point of the paraxial and marginal rays of the beam, respectively. The difference between the two positions is a measure for the spherical aberration in the beam.

In a special embodiment of the spherical-aberration detection system two focus detection systems each include a quadrant detector being detector, one quadrant arranged around the other quadrant detector. The inner quadrant captures mainly rays from an inner zone and the outer quadrant captures mainly rays from a zone around the inner zone.

A special embodiment of the detection system according to the invention includes a beam splitter arranged in the optical beam for splitting the optical beam in sub-beams pertaining to the concentric zones. Each of the focus-detection systems is arranged in the path of a sub-beam.

The focus-detection systems may be based on any focus detection method, such as e.g. the astigmatic focus detection method, the Foucault focus-detection method or the beam-size focus detection method. When the astigmatic method is used, the spherical-aberration detection system need not include the above beam splitter.

In accordance with a second aspect of the invention, the device for optically scanning an information layer of a record carrier. The devise has an objective system for focusing a radiation beam onto the information layer, a spherical-aberration detection system having an output for a signal representing a spherical aberration in radiation coming from the record carrier, wherein the spherical aberration detection system has the features of the spherical aberration detection system according to the invention.

A third aspect of the invention relates to a device for measuring the thickness of a transparent layer having a front surface and a rear surface. The device has an objective system for focusing a radiation beam through the entrance surface onto the rear surface, a spherical-aberration detection system having an output for a signal representing a spherical aberration in radiation coming from the transparent layer, and a calculating circuit for deriving a thickness of the transparent layer from the spherical aberration.

The objects, advantages and features of the invention will be apparent from the following more particular description of preferred embodiments of the invention, as illustrated in the accompanying drawings, in which.

BRIEF DESCRIPTION OF THE DRAWING

FIG. 1 shows an optical beam having spherical aberration. The wavefront of the beam is indicated by the drawn line 1. If the beam had no spherical aberration, the wavefront would be a spherical surface 2 centred on an axis 3. The difference between wavefronts 1 and 2 in the Figure is the lowest order spherical aberration in the Seidel presentation. Wavefronts 1 and 2 have the same curvature near axis 3. Rays of the beam are perpendicular to the wavefront. Paraxial rays, i.e. rays close to the axis such as the drawn rays 4 and 5, come to a focus 6 on the axis, the so-called paraxial focus. Rays further away from the axis, such as drawn rays 7 and 8, come to a focus 9, in the Figure located to the left of focus 6. Marginal rays, i.e. rays near the rim of the beam such as the drawn rays 10 and 11, come to a focus 12, the so-called marginal focus, in the Figure located to the left of focus 9. If the spherical aberration in the beam has a sign opposite to the situation drawn in the figure, focus 9 will be to the right of focus 6 and focus 12 will be to the right of focus 9. A focus-detection system arranged in the optical beam and capturing mainly paraxial rays of the beam will detect a focus position close to or equal to the position of paraxial focus 6. Another focus-detection system arranged in the same beam and capturing instead mainly marginal rays will detect a focus position close to or equal to the position of marginal focus 12. The difference of the two detected foci is a measure for the sign and magnitude of the spherical aberration. If the optical beam has no spherical aberration, the paraxial and marginal focus will coincide, and the focus-detection systems will detect the same focus position.

According to the invention, the spherical aberration of an optical beam can be measured by dividing the beam, into a plurality of concentric zones, detecting the focus of each of the zones and determining the spherical aberration from the positions of the foci. If the spherical aberration is predominantly of the lowest order, i.e. the Zernike $A_{40}$ term, two zones may suffice for the determination of the spherical aberration. These zones may be a central zone, centred on axis 3, and an annular zone near the rim of the beam. The zones need not be adjoining, but may overlap or spaced apart. Overlapping zones allow simple focus-detection systems, but they may cause a reduction of the detection accuracy. Spaced apart zones provide a more accurate detection of the focus positions, but the reduced area of the zones may cause a reduction of the detection precision. If the spherical aberration is of a higher order, e.g. the Zernike $A_{60}$ term, the number of zones is preferably larger than two.

Figure 1:
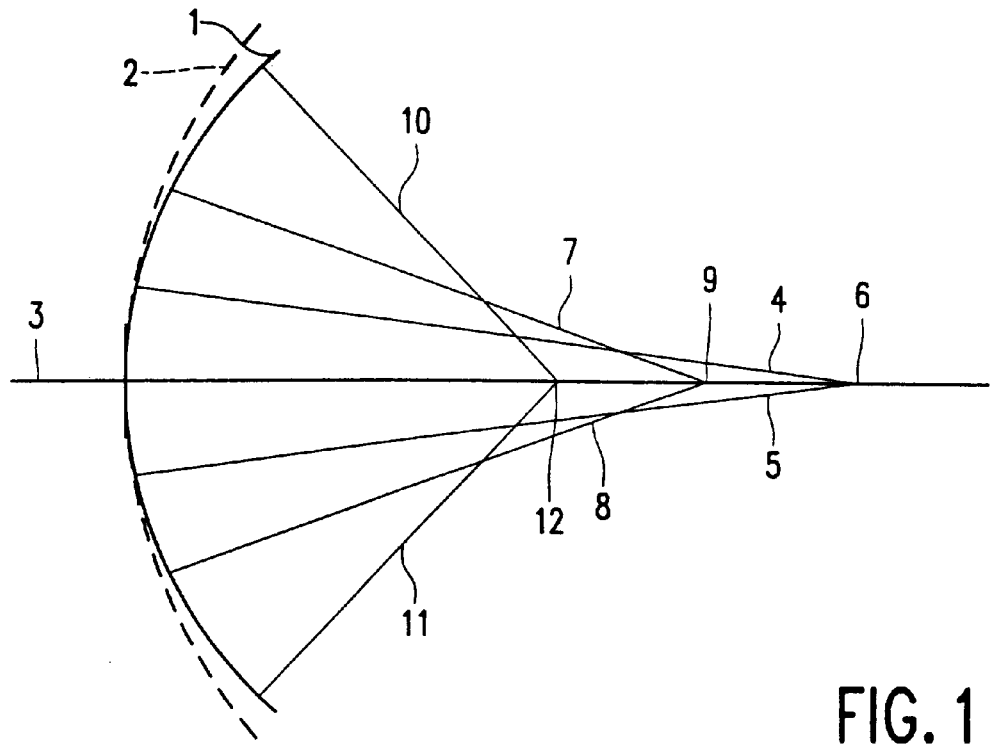
FIG. 1 shows an optical beam having spherical aberration.
Figure 2A:
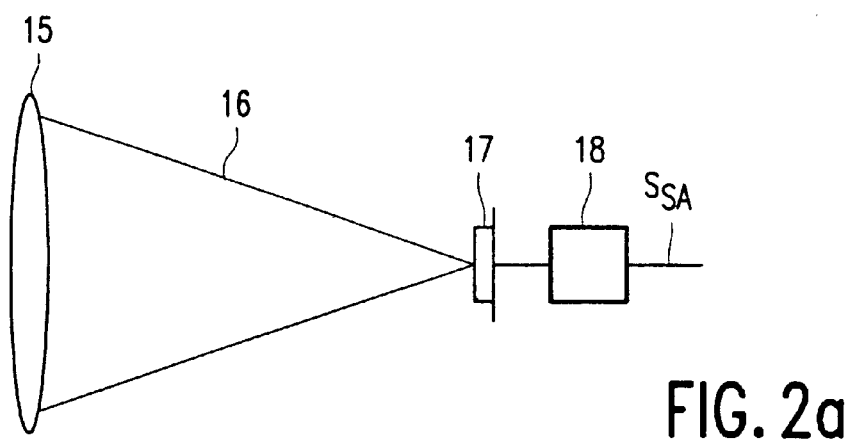
FIGS. 2a, 2b and 2c show an astigmatic spherical-aberration detection system, its split quadrant detector and its signal processor.
Figure 2B:
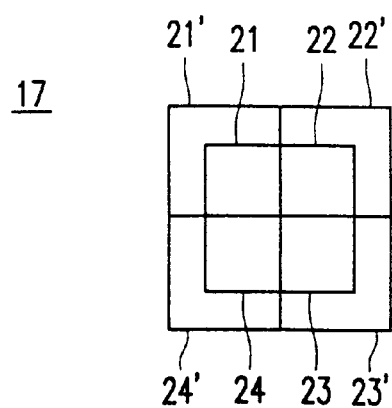
Figure 2C:
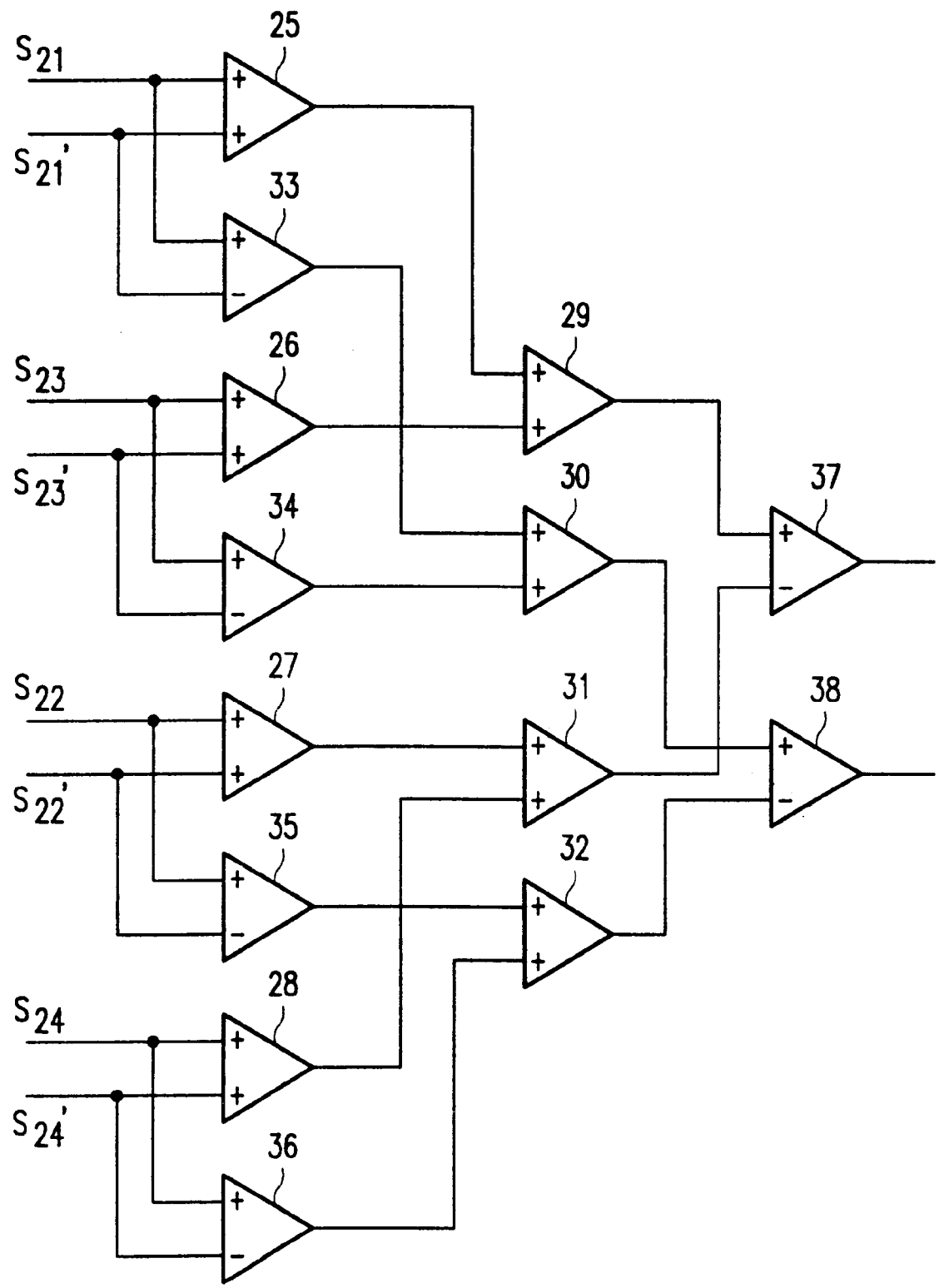

FIG. 2a shows an embodiment of the spherical-aberration detection system according to the invention. A lens 15 forms a radiation beam 16 focused on a detector 17. The electrical output signals of the detector are connected to a signal processor 18. The signal processor supplies a spherical-aberration signal $S_{SA}$, the value of which represents the spherical aberration in the optical beam. Detector 17 and signal processor 18 form a focus-detection system. Beam 16 is made astigmatic by an optical element, which may be lens 15. In FIG. 2b, detector 17 has an inner quadrant detector having four sub-detectors 21, 22, 23 and 24 and an outer quadrant detector also having four sub-detectors 21', 22', 23' and 24'. The amount of astigmatism in beam 16 is adjusted to the size of the inner quadrant detector such that the astigmatic spot formed by the paraxial rays in beam 16 falls mainly on the inner quadrant detector, whereas a substantial amount of energy of the focal lines of marginal rays in beam 16 fall on the outer quadrant detector. Preferably, the length of the sides of the inner quadrant detector are between 0.3 and 0.9 times the length of a side of the astigmatic spot, more preferably in a range from 0.7 to 0.8 times the length. The electrical output signals S21 to S24 of sub-detectors 21 to 24, respectively, are combined to form a focus error signal of the paraxial rays, whereas the electrical output signals S21' to S24' of sub-detectors 21' to 24', respectively, are combined to form a focus error signal of the marginal rays. FIG. 2c shows an embodiment of signal processor 18 for processing the eight output signals of detector 17, in which adders 25 to 32 and subtracters 33 to 38 form a focus error signal $S_{FE}$ from the inner and outer quadrant detector and the spherical aberration signal $S_{SA}$ from difference signals of the inner and outer quadrant detector. The signals are formed according to:

$$S_{FE}=[(S21+S21')+(S23+S23')]-[(S22+S22')+(S24+S24')]$$

$$S_{SA}=[(S21+S21')+(S23+S23')]+[(S22+S22')+(S24+S24')]$$

The focus error signal $S_{FE}$ is a measure for the distance between the best focus of beam 16 and the radiation-sensitive plane of detector 17. The spherical-aberration signal $S_{SA}$ is a measure for the spherical aberration present in beam 16.

Figure 3:
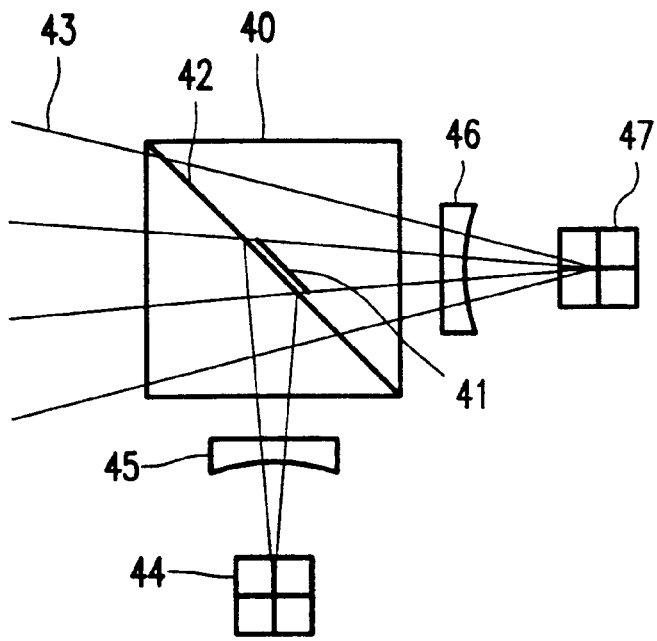
FIG. 3 shows an astigmatic spherical aberration detection system.

FIG. 3 shows a second embodiment of the spherical-aberration detection system according to the invention, based on the astigmatic focus-detection principle. A beam splitter cube 40 has a mirror 41 arranged on its splitting face 42. The mirror reflects the paraxial rays of an incoming beam 43 towards a first quadrant detector 44. A cylinder lens 45 in the path of the reflected beam introduces astigmatism in the beam. The cube beam splitter passes the marginal rays of beam 43, which, after passing a cylinder lens 46, are incident on a second quadrant detector 47. Quadrant detectors 44 and 47 are shown in front view in the Figure for clarity only. A not shown signal processor calculates the focus error of the first quadrant signal by forming two sum signals of output signals of opposing sub-detectors; the focus error signal is the difference of the two sum signals. Likewise, the error signal of the second quadrant detector is formed. The focus error of beam 43 can be taken as the sum of the focus error signals from the two quadrant detectors or as one of the focus error signals. The spherical aberration of beam 43 is proportional to the difference between the two focus error signals.

Figure 4:
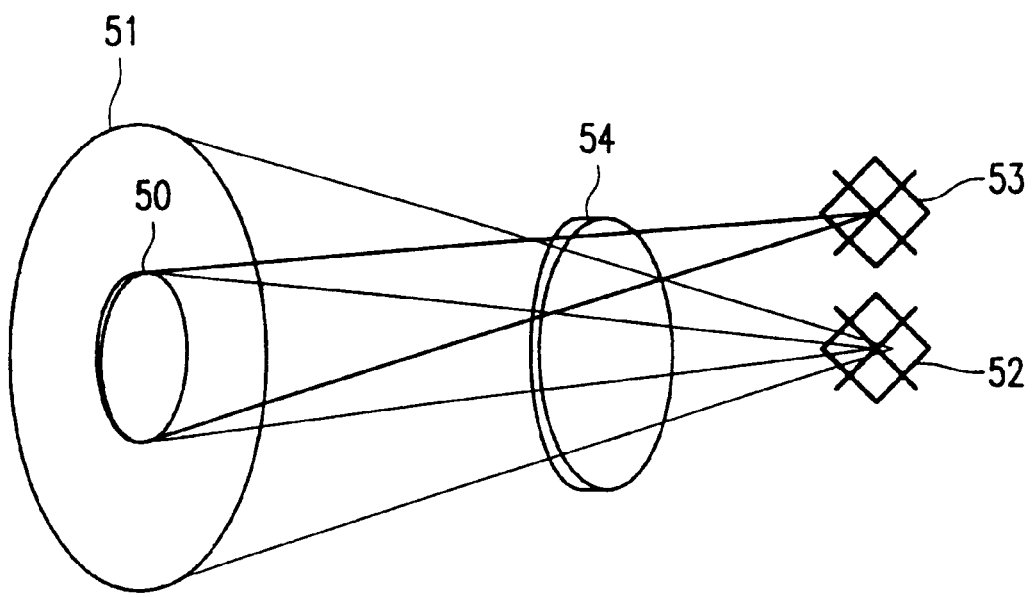
FIG. 4 shows an astigmatic spherical aberration detection system.

FIG. 4 shows a third embodiment of the spherical-aberration detection system, also based on the astigmatic principle. The system is comparable to the one shown in FIG. 3, except that the paraxial rays of the beam to be measured are deflected by a wedge 50. The wedge may be part of a lens or grating 51 converging the beam to a first quadrant detector 52. The deflected beam is focused on a second quadrant detector 53. An optical element 54, e.g. a cylinder lens imparts astigmatism to both the deflected beam and the not-deflected beam. The components 51 and 54 are shown in a perspective view and the quadrant detectors in frontal view for clarity only. The processing of the output signals of the two quadrant detectors is carried out in a way similar to the processing in the embodiment shown in FIG. 3.

The embodiments shown in FIGS. 3 and 4 have two separate detectors. These detectors are preferably positioned in the system by using a beam without spherical aberration. The positions are correct when both focus-detection systems indicate a zero focus error. In general, the focus error signal of each focus-detection system in the embodiments of FIGS. 2, 3 and 4 is amplified. The amplifications of the two focus-detection systems should be adjusted such that, with defocus but absence of spherical aberration, the difference of the two focus error signals is substantially equal to zero. The actual amplifications depend on the size of the zones. A correct adjustment reduces cross-talk between the focus-error signal and the spherical aberration signal.

Figure 5A:
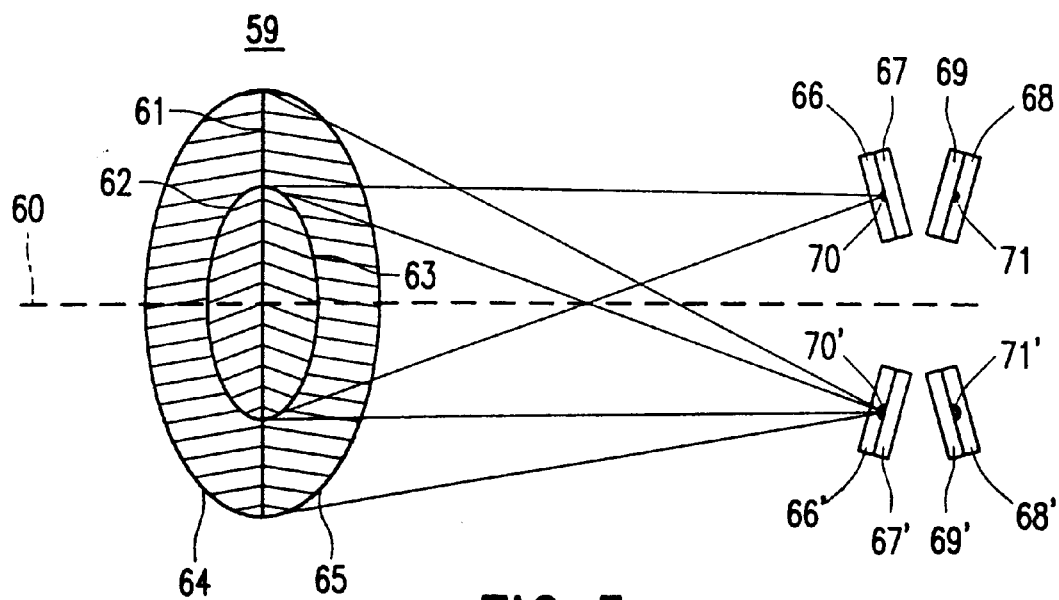
FIGS. 5a and b show a Foucault spherical aberration detection system and its signal processor.

FIG. 5a shows a fourth embodiment of the spherical-aberration detection system according to the invention, based on double Foucault focus detection. The Foucault focus detection is known from inter alia U.S. Pat. No. 4,665,310. A beam splitter 59 having an axis 60 and shown in a perspective view is divided in two halves by a dividing line 61. The beam splitter is also divided in a central zone, having two parts 62 and 63 on both sides of the dividing line, and an outer zone, also having two parts 64 and 65 on both sides of the dividing line. All four parts are provided with a grating structure, preferably blazed to increase deflection of radiation in the desired directions. The grating of inner part 62 deflects paraxial rays towards a split detector having two sub-detectors 66 and 67 on both sides of a dividing line, which is substantially directed towards axis 60. Likewise, the grating of inner part 63 deflects paraxial rays towards a split detector having two sub-detectors 68 and 69 on both sides of a dividing line, which is also substantially directed towards axis 60. The radiation spots 70 and 71 on the split detectors are shown as small half circles. The gratings of the two outer zones 64 and 65 deflect marginal rays towards split detectors having sub-detectors 66', 67' and 68', 69' respectively. The dividing lines of these split detectors are both substantially directed towards axis 59. The radiation spots 70' and 71' on the split detectors are indicated as two small half rings.

Figure 5B:
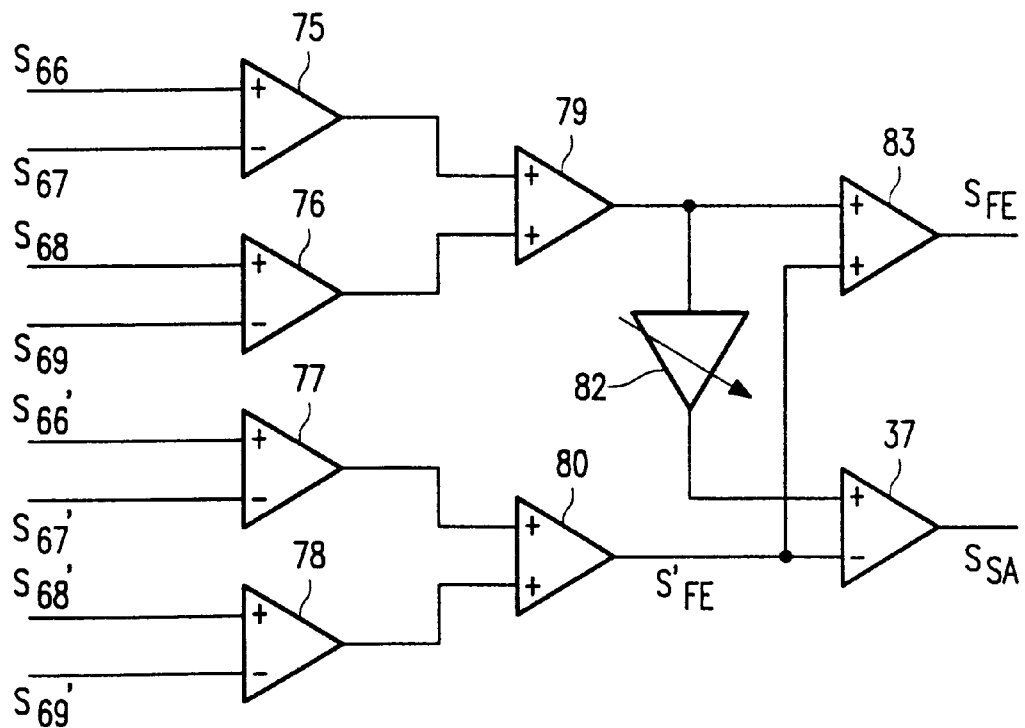

FIG. 5b shows an embodiment of the signal processor for forming a focus error signal $S_{FE}$ and a spherical aberration signal $S_{SA}$. Subtracters 75 to 78 and adders 79 and 80 form a focus error signal $S_{FE}$ from detector output signals S66 to S69 and a focus error signal $S'_{FE}$ from detector output signals S66' to S69', where Sxx is an output signal of sub-detector xx. The signals are formed according to:

$S_{FE}=(S66-S67)+(S68-S69)$ $S_{FE}'=(S66'-S67')+(S68'-S69')$ $S_{SA}=S_{FE}-S_{FE}'$

The focus error signal may also be formed by adding the focus error signals of the inner and outer quadrant detectors, i.e. by adding the output signals of adders 79 and 80 by a further adder 83. The focus error and spherical aberration signals may be made independent of the amount of radiation incident on the split detectors by dividing each of the signals by the sum of the output signals of the two corresponding split detectors or by the sum of the output signals of all four split detectors. A subtracter 81 subtracts marginal focus error signal $S'_{FE}$ from paraxial focus error signal $S_{FE}$ and forms spherical aberration signal $S_{SA}$. An amplifier 82 with adjustable amplification factor may be arranged before subtracter 81 to give the required amplification to $S_{FE}$ for reducing the focus error to spherical aberration crosstalk.

The fourth embodiment may be changed to a single Foucault detection system by replacing the split detectors 68, 69 and 68', 69' by two single detectors. It will be clear that the split detectors of the Foucault focus-detection system may be used in the embodiments shown in FIGS. 3 and 4, replacing the quadrant detectors. The focus detection of the embodiments of FIGS. 3, 4 and 5 may also by carried by according to the so-called beam-size method, known from inter alia U.S. Pat. No. 4,724,533.

Figure 6:
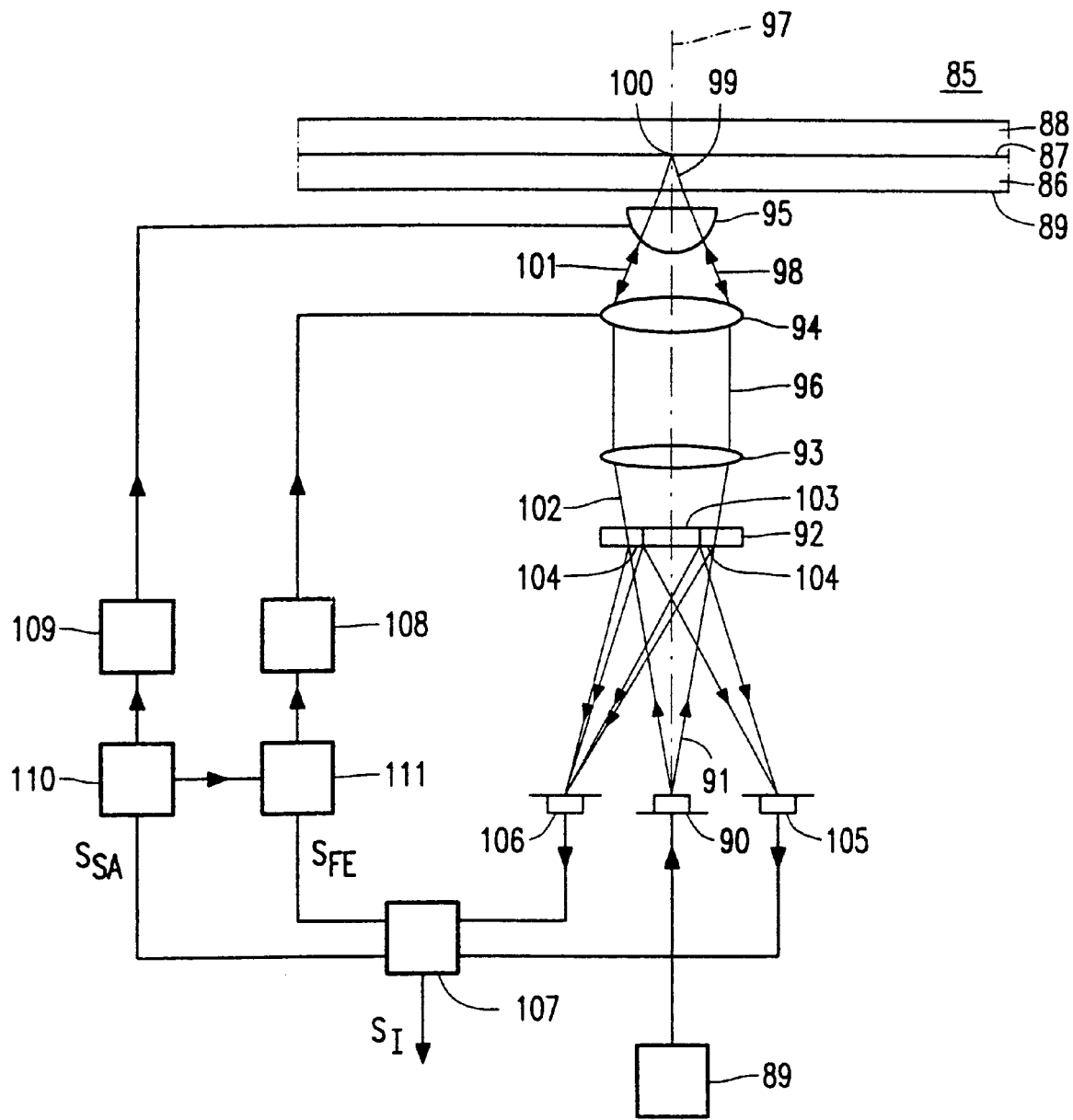
FIG. 6 shows an optical player using a spherical aberration detection system for positioning of a lens in the objective system.

The spherical aberration detection system according to the invention can advantageously be used in optical players. FIG. 6 shows an optical player for scanning an optical record carrier 85. The record carrier has a transparent layer 86, on one side of which an information layer 87 is arranged. The side of the information layer facing away from the transparent layer is protected from environmental influences by a protection layer 88. The side of the transparent layer facing the device is called the entrance face 89. Transparent layer 86 acts as a substrate for the record carrier by providing mechanical support for the information layer. Alternatively, the transparent layer may have the sole function of protecting the information layer, while the mechanical support is provided by a layer on the other side of the information layer, for instance by protection layer 88 or by a further information layer and transparent layer connected to information layer 87. Information may be stored in information layer 87 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device includes a radiation source 90 controlled by a driver 89, for example a semi-conductor laser, emitting a diverging radiation beam 91. A beam splitter 92 transmits the radiation towards a lens system. The lens system includes a collimator lens 93, an objective lens 94 and a plano-convex lens 95. Collimator lens 93 changes diverging radiation beam 91 to a collimated beam 96. Objective lens 94, having an optical axis 97, transforms collimated radiation beam 96 into a converging beam 98 incident on lens 95. Collimator lens 93 and objective lens 94 may be combined into a single lens. Plano-convex lens 95 changes incident beam 98 into a converging beam 99, which comes to a focus 100 on information layer 87. Plano-convex lens 95 has a convex surface and a flat surface. The flat surface faces transparent layer 89 and forms a gap between the lens and the layer. Lens 95 may also be a bi-convex or convex-concave lens, possibly provided with one or two aspherical surfaces. Although objective lens 94 is indicated in the Figure as a single lens element, it may have several elements, and may alternatively include a hologram operating in transmission or reflection, or a grating for coupling radiation out of a waveguide carrying the radiation beam.

Radiation of converging beam 99 reflected by information layer 87 forms a reflected beam 101, which returns on the optical path of the forward converging beam 98. Objective lens 94 and collimator lens 93 transform reflected beam 101 to a converging reflected beam 102. Beam splitter 92 is of a type similar to beam splitter 59 shown in Figure 5a, and has an inner zone 103 and an outer, annular zone 104. Part of the radiation of beam 102 incident on central zone 103 is deflected towards a detector 105, part of the radiation incident on outer zone 104 is deflected towards a detector 106. The detectors are single split detectors or double split detectors as shown in FIG. 5a. The output signals of the detectors are processed in a signal processor 107. The signal processor forms a focus error signal $S_{FE}$ and a spherical aberration signal $S_{SA}$ according to the Foucault method as explained in relation to FIG. 5b. The signal processor also forms an information signal $S_I$, the value of which represents the information read from the information layer 87. The information may be formed as an addition of the output signals of several sub-detectors.

The focus error signal is used as input for a first servo controller 108, which drives an actuator, not shown in the Figure. The actuator controls the axial position of objective lens 94, thereby controlling the axial position of focus 100 such that it coincides substantially with the plane of information layer 87. The part of the detection system, including one or more radiation-sensitive detection elements and the signal processor the output signal of the detection elements, used for generating the focus error is called the focus error detection system. The focus servo system for positioning the lens includes the focus error detection system, the focus servo controller and an actuator for moving the lens system.

The spherical aberration which arises when the radiation beam has to be focused through a transparent layer which is thicker than the design thickness of the layer, is compensated for by changing the axial position of lens 95. The change causes the plano-convex lens to produce, due to the changing magnification, an amount of spherical aberration which cancels the aberration produced by the thicker transparent layer. To this end the spherical aberration signal $S_{SA}$ is supplied to a second servo controller 109, which drives an actuator, not shown in the Figure. The actuator controls the axial position of plano-convex lens 95. The servo system for lens 95 keeps the lens at an axial position where the spherical aberration has a minimum value.

When the axial position of lens 95 is changed, the axial position of focus 100 will in general also change. Hence, the change introduces not only spherical aberration in beam 99, also defocus. The focus servo system for objective lens 94 will move the focus back to the information layer 87. The demand on the focus servo system may be reduced and the positioning of focus 100 improved by adding a feed-forward branch between the two servo systems. Thereto spherical aberration signal $S_{SA}$ is amplified by amplifier 110 to obtain the desired gain of the feed-forward branch. An output signal of the amplifier is supplied to an adder 111, which adds the output signal to focus error signal $S_{FE}$.

Figure 7:
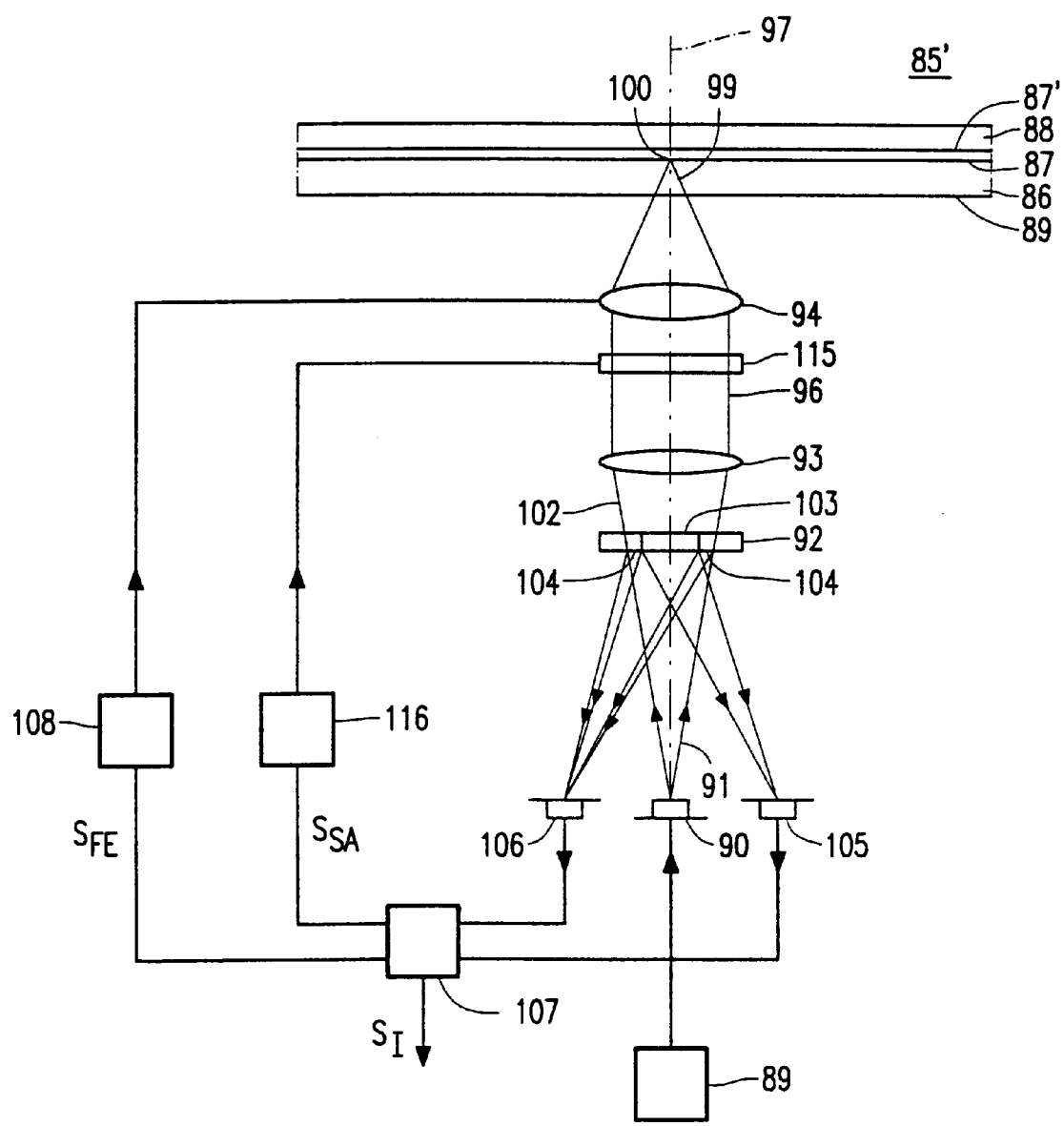
FIG. 7 shows an optical player using a spherical aberration detection system for driving an aberration compensator.

The spherical-aberration detection system according to the invention may also be used advantageously in a multilayer optical player system as shown in FIG. 7. Record carrier 85' has two information layers 87 and 87', separated by a spacer layer. The optical player can change from one information layer to another by changing the axial position of focus 100 through an axial displacement of objective lens 94. The different amounts of record carrier material traversed by beam 99 for the different information layers changes the spherical aberration the record carrier introduces in the beam. These changes are compensated by a spherical-aberration compensator 115, arranged in the optical path between radiation source 90 and focus 100. The spherical-aberration compensator imparts a phase shift to the wavefront that passes the compensator, the magnitude and sign of the phase shift depending on the position in the wavefront. The compensator may be e.g. a liquid-crystal cell or a deformable folding mirror.

Signal processor 107 supplies a focus error signal $S_{FE}$ and a spherical aberration signal $S_{SA}$, formed as in the embodiment shown in FIG. 6. The focus error signal is supplied to focus servo controller 108, which drives a not shown actuator axially displacing objective lens 94. The spherical aberration signal is supplied to an aberration controller 116, for driving compensator 115. The spherical aberration caused by a change in the position of focus 100 will be detected by the spherical aberration detection system, including the elements 92, 105, 106 and 107, and is fed back to compensator 115. Hence, a minimum spherical aberration is obtained, independent of the information layer being scanned.

Figure 8:
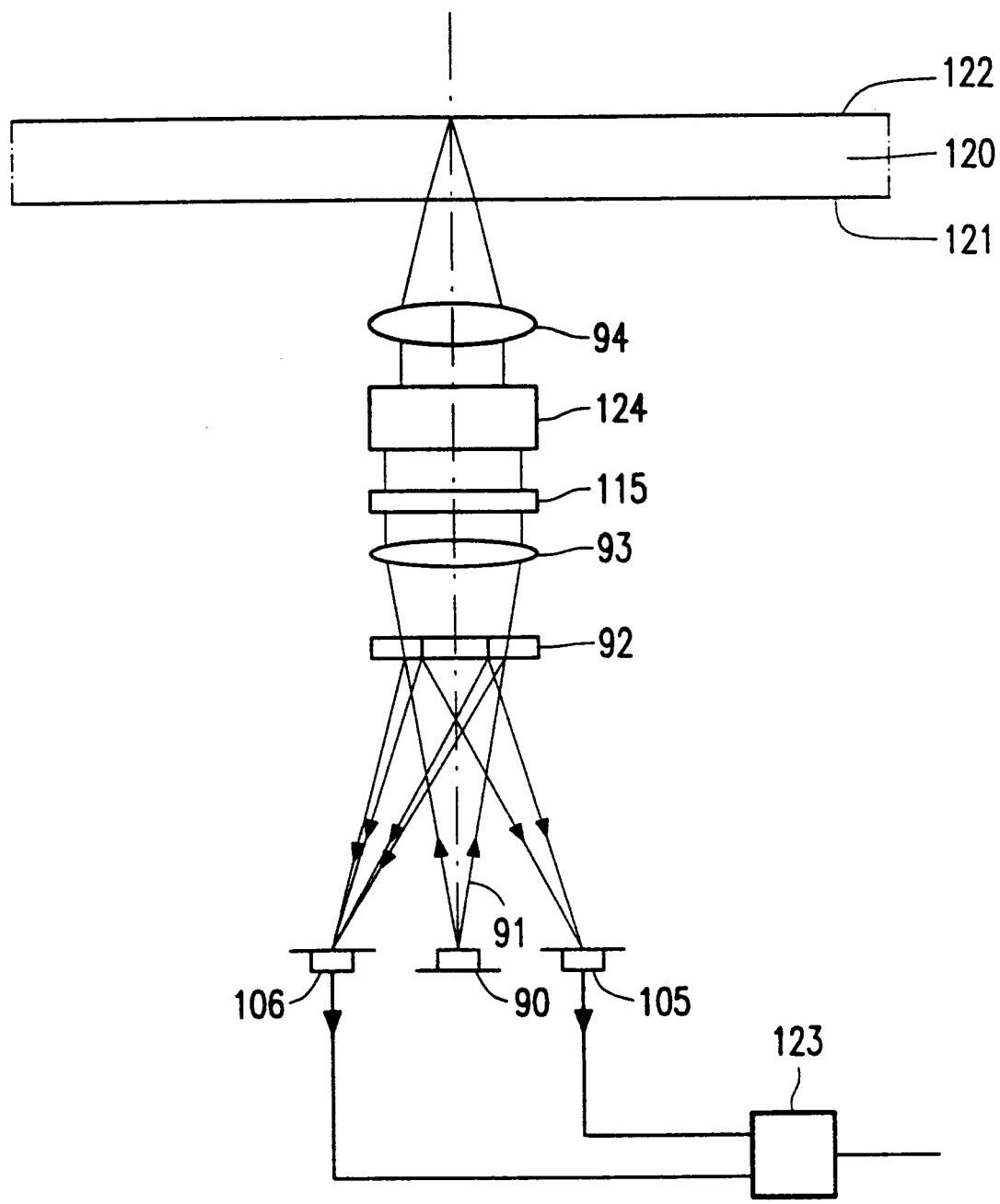
FIG. 8 shows a device for measuring the thickness of a transparent layer.

The spherical aberration detection system according to the invention may also be used in a device for the measurement of the thickness of transparent layers. FIG. 8 shows such a device and a transparent layer 120 under test. Elements of the device similar to those in the device shown in FIG. 7 have identical reference numbers. Radiation beam 91 is focused through front surface 121 onto rear surface 122 of the layer. Radiation reflected through the front surface is captured by the spherical-aberration detection system that includes elements 92, 105 and 106, which measures the spherical aberration in the reflected beam. Since the spherical aberration is linearly related to the thickness of the layer, the spherical aberration is a suitable measure for the thickness of the layer. A calculating circuit 123 derives the thickness of transparent layer 120 from the measured spherical aberration, the value of the numerical aperture of the radiation beam incident on the transparent layer and the refractive index of the transparent layer. Since the spherical aberration depends on the numerical aperture of the focused beam, a small numerical aperture beam may be used for measuring relatively large thicknesses and a high numerical aperture beam for measuring relatively small thicknesses. The device may therefor be provided with an adjustable beam expander 124 for increasing or decreasing the cross-section of the beam coming from collimator lens 93. A small cross-section at the objective lens side of the beam expander results in a small numerical aperture of the beam focused by objective lens 94 on transparent layer 120. If the spherical aberration induced by a layer of nominal thickness is compensated, the device may be used to measure small deviations from the nominal thickness. Such a compensation may be performed by spherical aberration compensator 115. The accuracy of the thickness measurement can be a few micrometer on a total thickness of the order of a millimeter.

It will be apparent that any of the detection systems shown in FIGS. 2, 3, 4 or 5 may be used in the players of FIG. 6 and 7 and the measuring device of FIG. 8.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features.

Thus, the scope of the invention is only limited by the following claims:

1. A detection system comprising:

detection means including a plurality of focus-detection systems, for supplying different focus error signals depending on radiation in a different respective concentric zones in a cross-section of a radiation beam; and measuring means for deriving a measurement of a spherical-aberration of the radiation beam from a combination of the different focus error signals from the respective detectors for different concentric zones.

2. The system of claim 1, wherein:

the focus-detection systems include a first quadrant detector; and the focus detection systems include a second quadrant detector arranged around the first quadrant detector.

3. The system of claim 1, in which:

the focus detection systems include a focus-detection system for supplying a central focus error signal depending on radiation in a central zone of the radiation beam and an annular focus detection system for supplying a focus error signal depending on radiation in an annular zone of the radiation beam; and the spherical-aberration is proportional to the difference between the respective central and annular focus error signals.

4. The system of claim 1, further comprising beam splitting means arranged in the radiation beam for splitting the radiation beam into sub-beams of radiation from the respective concentric zones.

5. The system of claim 1, wherein at least one of the focus-detection systems is an astigmatic focus detection system, a Foucault focus-detection system, or a beam-size focus detection system.

6. The device of claim 1 in which the different zones overlap.

7. A device comprising:

focusing means including an objective system, for focusing a radiation beam onto an information layer of a record carrier;

detection means including a plurality of focus-detection systems, for supplying a plurality of different focus error signals depending on radiation from different respective concentric zones in a cross-section of the radiation beam traveling from the information layer; and measuring means including a signal processor, for deriving a measurement of a spherical-aberration of the radiation beam from a combination of the different focus error signals spherical-aberration signal means for providing a spherical-aberration signal depending on the spherical-aberration measurement.

8. The device of claim 7, wherein:

the objective system has a first lens and a second lens arranged between the first lens and the record carrier;

the device further comprises a second servo system for positioning the second lens along an optical axis of the second lens depending on the spherical-aberration signal to reduce the spherical-aberration in the radiation beam traveling from the information layer.

9. The device of claim 8, wherein the device further comprises:

focus signal means for providing a focus control signal representing a focus error between a focus of the radiation beam and the information layer and depending on one or more of the focus error signals;

a first servo system for positioning the first lens along the optical axis of the first lens depending on the focus control signal to reduce the focus error between the focus of the first radiation beam and the information layer.

10. The device of claim 7, in which:

the device further comprises spherical-aberration compensator means for compensating for spherical-aberration in the radiation beam from the information layer depending on the spherical-aberration signal.

11. The device of claim 7, wherein:

the objective system has a first lens and a second lens arranged between the first lens and the record carrier;

the device further comprises:

focus signal means for supplying a focus control signal representing a focus error between a focus of the radiation beam and the information layer and depending on one or more of the focus error signals;

a first servo system for positioning the first lens along the optical axis of the first lens depending on the focus control signal to reduce the focus error between the focus of the first radiation beam and the information layer.

12. The device of claim 11, wherein:

the device further comprises a second servo system for positioning the second lens along an optical axis of the second lens depending on the spherical-aberration detection signal to reduce the spherical-aberration in the radiation beam traveling from the information layer.

13. A device comprising:

focusing means including an objective system for focusing a radiation beam through a front surface onto a rear surface of a transparent layer;

means for detecting a spherical-aberration of the radiation beam traveling from the rear surface of the transparent layer and for providing a signal representing the spherical-aberration, and including a spherical-aberration detection system having an output for the signal representing the spherical-aberration and including:

detection means including a plurality of focus-detection systems, each for supplying a focus error signal depending on radiation from a different concentric zone in a cross-section of the radiation beam traveling from the transparent layer; and measuring means including a signal processor for deriving a measurement of the spherical-aberration of the radiation beam from the plurality of focus error signals; and the device further comprising calculating means including a calculating circuit for deriving a measurement of thickness of the transparent layer from the measurement of spherical-aberration.

14. A device comprising:

focus means for focusing a radiation beam onto an information layer of a record carrier, the objective system has a first lens and a second lens arranged between the first lens and the record carrier;

detection means including a plurality of focus-detection systems, for supplying a plurality of different focus error signals depending on radiation from different respective concentric zones in a cross-section of the radiation beam traveling from the information layer;

measuring means for deriving a measure of the spherical-aberration of the radiation beam depending on a combination of a plurality of the focus error signals;

spherical-aberration signal means for providing a spherical-aberration signal depending on the spherical-aberration measurement;

focus signal means for supplying a focus control signal representing a focus error between a focus of the radiation beam and the information layer and depending on one or more of the focus error signals;

a first servo system for positioning the first lens along the optical axis of the first lens depending on the focus control signal to reduce the focus error between the focus of the first radiation beam and the information layer; and a second servo system for positioning the second lens along an optical axis of the second lens depending on the spherical-aberration signal to reduce the spherical-aberration depending on the measure of spherical-aberration.

* * * * *